United States Patent
Hind et al.

(10) Patent No.: US 7,496,907 B2
(45) Date of Patent: Feb. 24, 2009

(54) METHOD AND SYSTEM FOR PROFILE NORMALIZATION IN AN AUTONOMIC SOFTWARE SYSTEM

(75) Inventors: Michael J. Hind, Cortlandt Manor, NY (US); Peter F. Sweeney, Spring Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 10/635,199

(22) Filed: Aug. 6, 2003

(65) Prior Publication Data

US 2005/0034105 A1 Feb. 10, 2005

(51) Int. Cl.
G06F 9/45 (2006.01)
G06F 9/44 (2006.01)

(52) U.S. Cl. .................. 717/158; 717/124; 717/130; 717/151; 717/153; 717/154

(58) Field of Classification Search ......... 717/127–130, 717/124, 151, 153, 154, 158
See application file for complete search history.

(56) References Cited

U.S. PATENT DOCUMENTS

| | | | | |
|---|---|---|---|---|
| 5,768,500 A | * | 6/1998 | Agrawal et al. | 395/184 |
| 6,126,329 A | * | 10/2000 | Bennett et al. | 395/704 |
| 6,519,571 B1 | * | 2/2003 | Guheen et al. | 705/14 |
| 6,763,452 B1 | * | 7/2004 | Hohensee et al. | 712/227 |
| 6,934,935 B1 | * | 8/2005 | Bennett et al. | 717/127 |
| 2004/0244006 A1 | * | 12/2004 | Kaufman et al. | 718/105 |

OTHER PUBLICATIONS

Romer et al., Instrumentation and Optimization of Win32/Intel Executables Using Ethc, Aug. 1997, USENIX□□http://research.microsoft.com/users/alecw/usenix-nt-1997.pdf.*
"Online Profiling and Feedback-Directed Optimization of Java", by Matthew Arnold, New Brunswick, New Jersey, Oct. 2002.
"Online Feedback-Directed Optimization of Java", by Matthew Arnold, et al., 2002; pp. 111 to 129; and.
"Adaptive Optimization in the Jalapeño JVM", by Matthew Arnold, et al., 2000; pp. 47 to 65.

* cited by examiner

*Primary Examiner*—William H Wood
(74) *Attorney, Agent, or Firm*—Scully, Scott, Murphy & Presser, P.C.; Gail Zarick, Esq.

(57) ABSTRACT

There is provided an autonomic software system and method for normalizing a profile collected for an executing application to account for one or more actions applied to the executing application after the profile was collected, comprising: predicting an impact on the profile of applying the one or more actions to the executing application; and adjusting the profile to form a normalized profile according to the predicted impact. A plurality of different a profile consumers, such as, a phase shift detector, an action evaluator as well as a normalizing controller, may utilize the normalized profile to improve the behavior of the executing application. In addition, online visualization tools may be implemented to graphically depict the normalized profiles, as well as differences between the collected profiles and the normalized profiles.

5 Claims, 8 Drawing Sheets

METHOD AND SYSTEM FOR PROFILE NORMALIZATION IN AN AUTONOMIC SOFTWARE SYSTEM

BACKGROUND OF THE INVENTION

1. Technical Field of the Invention

The present invention generally relates to autonomic software systems. More specifically, the present invention is directed to an autonomic software system and method enabled to normalize a profile obtained from an executing application to account for actions applied by the autonomic system to the executing application after the profile is collected for improving the subsequent behavior of the application.

2. Description of the Prior Art

In an autonomic software system, decisions to "improve" an application are made online, i.e., as the application is executing. Specifically, the autonomic software system utilizes past application behavior during current application execution to predict future behavior of the application. Utilizing the predicted future behavior of the application, the autonomic software system may apply one or more actions (hereinafter "actions" will be used for simplicity) to the application to improve its future behavior. However, the autonomic software system is time sensitive with the following conflicting constraints: 1) deciding what actions to perform and performing those actions take clock cycles away from the execution of the application (the actions are performed while the application is executing); and 2) the longer the application executes before the actions are applied, the longer the application remains without the benefit of improvement.

Typically, the autonomic software system utilizes profiling to determine the behavior of the application, subsequently utilizes profiling information to predict the future behavior of the application, and applies actions to improve the execution of the application. The actions that the autonomic software system considers applying to the application generally determine what profiling information the autonomic software system particularly needs to obtain. For example, profiling the number of times that a method is called by the application may be used by the autonomic software system to decide whether the method should be inlined, i.e., replacing the call to the method in the body of the application with the actual statements of the method, thereby eliminating the call to that method and improving the application. As an additional example, profiling the time spent in a method of the application may be used by the autonomic software system to determine whether the method should be optimized. As a final example, profiling the communication between distributed objects may be used by the autonomic software system to determine which distributed objects should migrate between machines, thereby localizing often-invoked distributed objects to the machines from which they are invoked.

As abovementioned, the autonomic software system can change the application's runtime characteristics through the actions that the autonomic software system applies to the application on the basis of profiling information (profile) obtained from the executing application. The applied actions may cause a change in the subsequent profiling information collected for the executing application. In this situation, regions of the code of the application changed by the application of the actions will take more or less time to execute and will appear more or less frequently in the subsequent time-based profiling information. However, the profiling information obtained from the executing application does not account for the actions applied by the autonomic system to the executing application after the profile is collected. Therefore, it is desirable to normalize a profile with respect to the actions applied by a autonomic system so that the effects of the applied actions are incorporated into the normalized profile to thereby allow the autonomic software system to make better decisions when either the normalized profile is compared to subsequent time-based profiles of the application's behavior after the actions have been applied or to determine the next best action to choose given a normalized profile. In contrast, if the profile is not normalized with respect to the actions applied by an autonomic software system, then the comparison of the profile with subsequent profiles between which actions have been applied may result in the autonomic software system making faulty decisions, which is not desirable. It is note be noted that other profiling techniques alternative to the time-based profiling are known and are applicable herein.

For example, subsequent profiles may be compared to detect changes in the application's behavior. Changes in behavior of the executing application that are inherent to the application are known as phase shifts. The design and structure of the application may be conceptualized as a series of phases, where the computation of the application proceeds from one phase to the other. For the autonomic software system, the detection of phase shifts as the application executes is important because the phase shifts may indicate different resource requirements. Unfortunately, if a profile is not normalized with respect to the actions applied by the autonomic software system to the executing application, the autonomic software system cannot determine if a change in the application's behavior is due to an inherent application behavior change or a change induced by the actions. Conventionally, a phase shift may be detected by comparing behavior of the executing application in several given time intervals during which a set of runtime events execute. If the behavior of each time interval differs by some significant amount then a phase shift may have occurred or be occurring. Otherwise, if the behavior does not differ substantially, the application may be executing in a steady state. However, where the behavior of the application is modified on the fly (i.e., online) as described above, it is more problematic for the autonomic software system to detect a phase shift because the application's behavior between the several time intervals may change because of the modifications made by autonomic software system and not due to a phase shift from one phase to another.

FIG. 1 represents an illustration of a prior art autonomic system 100 that depicts the foregoing shortcomings of the prior art autonomic system. More specifically, in the prior art autonomic software system 100, an application is executed in a run time environment 102 via a profiling agent 104. The profiling agent 104 profiles the executing application 106 to generate a profile 110. The profile is transmitted to a prior art controller 114 and phase shift detector 124. The controller 114 controls the timing of when the profile 110 is collected via a control signal 108. It is noted that a plurality of profiles may be collected by the profiling agent 104, as directed by the controller 114 via the control signal 108. Generally, the controller 114 comprises a behavior adjustor 116 that adjusts the behavior of the executing application 106 by applying one or more actions 112 to the executing application. It is noted that the behavior adjustor 116 may apply no actions to the executing application as will be discussed below. The behavior adjustor 116 comprises an analyzer 118, selector 120 and applicator 122. The analyzer 118 receives and analyzes the profile 110. More specifically, the analyzer 118 receives raw data via profile 110 and transforms the raw data into a set of data that is utilizable by the controller 114. The set of data may include a sequence of basic blocks, pairs of method IDs and associated execution times, sequences of instruction cache misses, etcetera. For example, the analyzer 118 may analyze raw data, such as a plurality of method identifiers, and transform the raw data into canonical form, such as a weighted set of method identifiers where the weight of each method identifier equals the number of times the method identifier appeared in the raw data. The selector 120 receives the set of data from the analyzer 118 and selects one or more actions to be applied 112 to the executing application 106 that may help to improve the behavior of the executing application. In its determination, the selector 120 may use a cost-benefit model to determine if the cost of optimizing a method, represented by a method identifier for example, is less than the expected optimization benefit from a subsequent execution of the method, i.e., whether optimizing the method would improve the application's performance. The selector 120 then transmits the selected one or more selected actions 112 to the applicator 122, which applies the one or more actions 112 to the executing application 106. It is noted, that the selector may select no actions based on the cost-benefit model, in which case the applicator 122 will not apply any actions. An article by Arnold, Mathew, et al. ("Adaptive Optimization in the Jalapeno JVM." Proceedings of the ACM Conference on Object-Oriented Programming Systems, Languages, and Applications October 2000), discloses the foregoing example. During a subsequent predetermined time interval, the profiling agent 104 may collect another profile 110 of the executing application 106 as controlled via the control signal 108. As is clear from the prior art autonomic system 100 of FIG. 1, the shortcoming of the autonomic system 100 is that neither the controller 114 nor the phase shift detector 124 has the benefit of utilizing the profile 110 obtained from the executing application that accounts for the one or more actions 112 applied to the executing application 106, after the profile 110 is collected from the executing application 106, but before the subsequent profile is collected from the executing application 106

Therefore there is a need in the art for providing an autonomic software system and method enabled to normalize or adjust a profile obtained from an executing application to account for one or more actions applied by the autonomic software system to the executing application after the profile is collected to improve the subsequent behavior of the executing application.

SUMMARY OF THE INVENTION

It is an object of the present invention to provide an autonomic software system and method enabled to normalize a profile collected for an executing application to account for actions applied by the autonomic software system to the executing application after the profile is collected.

According to an embodiment of the present invention, there is provided a method for normalizing a profile collected for an executing application to account for one or more actions applied to the executing application after the profile was collected, the method comprising: predicting an impact of applying the one or more actions to the executing application by utilizing the profile and the one or more actions; and adjusting the profile to form a normalized profile according to the predicted impact.

According to another embodiment of the present invention; there is provided a system for normalizing a profile collected for an executing application to account for one or more actions applied to the executing application after the profile was collected, the system comprising: a predictor for predicting an impact of applying the one or more actions to the executing application by utilizing the profile and the one or more actions; and an adjuster for adjusting the profile to form a normalized profile according to the predicted impact.

According to yet another embodiment of the present invention, there is provided a method for adjusting a profile collected for an executing application to account for one or more actions applied to the executing application to improve detection of phase shifts in the executing application after the profile was collected, the method comprising: collecting a first profile for the executing application; predicting an impact of applying the one or more actions to the executing application by utilizing the first profile and the one or more actions; adjusting the profile to form a normalized profile according to the predicted-impact; applying the one or more actions to the executing application; collecting a second profile for the executing application; and detecting a phase shift in the executing application by utilizing the normalized profile and the second profile.

According still another embodiment of the present invention, there is provided a system for adjusting a profile collected for an executing application to account for one or more actions applied to the executing application to improve detection of phase shifts in the executing application after the profile was collected, the system comprising: a profiling agent for collecting a first profile and a second profile for the executing application; a predictor for predicting an impact of applying the one or more actions to the executing application by utilizing the first profile and the one or more actions; an adjuster for adjusting the first profile to form a normalized profile according to the predicted impact; an applicator for applying the one or more actions to the executing application; and a phase shift detector for detecting a phase shift in the executing application by utilizing the normalized profile and the second profile.

According to a further embodiment of the present invention, there is provided a method for adjusting a profile collected for an executing application to account for one or more actions applied to the executing application to determine whether there is improvement in the execution of the executing application after the profile was collected, the method comprising: collecting a first profile for the executing application; selecting and applying one or more actions to the executing application; predicting an impact of applying the selected one or more actions to the executing application by utilizing the first collected profile and the one or more actions; adjusting the first profile to form a normalized profile according to the predicted impact; collecting a second profile for the executing application; evaluating the second profile against the normalized profile to determine whether there is expected improvement in the execution of the executing application; and applying one or more actions to undo the one or more actions applied to the executing application if there is no expected improvement in the executing application.

According to yet a further embodiment of the present invention, there is provided a system for adjusting a profile collected for an executing application to account for one or more actions applied to the executing application to determine whether there is improvement in the execution of the executing application after the profile was collected, the system comprising: a profiling agent for collecting a first profile and a second profile for the executing application; a selector for selecting one or more actions to apply to the executing application; a predictor for predicting an impact of applying the selected one or more actions to the executing application by utilizing the first collected profile and the one or more actions; an adjuster for adjusting the first collected profile to form a normalized profile according to the predicted impact; action evaluator for evaluating the second profile against the normalized profile to determine whether there is expected improvement in the execution of the executing application; and applicator for applying the selected one or more actions and one or more actions that undo the applied one or more actions if there is no expected improvement in the executing application.

According to still a further embodiment of the present invention, there is provided a method for adjusting a profile collected for an executing application to account for one or more actions applied to the executing application to improve execution of the executing application after the profile was collected, the method comprising: applying a first selected action to the executing application based on the collected profile; predicting an impact of applying the first selected action to the executing application by utilizing the collected profile and the first selected action; adjusting the collected profile to form a first normalized profile according to the predicted impact; applying a second selected action to the executing application based on the first normalized profile or a subsequently normalized profile; predicting an impact of applying the second selected action to the executing application by utilizing the first normalized profile and the second selected action; adjusting the first normalized profile to form a second normalized profile according to the predicted impact; and repeating the applying, predicting and adjusting steps for the second normalized profile and every subsequently normalized profile and selected action.

According to a final embodiment of the present invention, there is provided a system for adjusting a profile collected for an executing application to account for one or more actions applied to the executing application to improve execution of the executing application after the profile was collected, the system comprising: a predictor for predicting an impact of applying a first selected action to the executing application by utilizing the collected profile and the first selected action; an adjuster for adjusting the collected profile to form a first normalized profile according to the predicted impact; and an applicator for applying the first selected action to the executing application based on the collected profile, applying a second selected action to the executing application based on the first normalized profile and repeatedly applying each selected action from each subsequently normalized profile to the executing application.

BRIEF DESCRIPTION OF THE DRAWINGS

The features and advantages of the present invention will become apparent to one skilled in the art, in view of the following detailed description taken in combination with the attached drawings, in which.

DETAILED DESCRIPTION OF THE PREFERRED EMBODIMENT OF THE INVENTION

The present invention is directed to an autonomic software system and method enabled to normalize a profile obtained from an executing application to account for actions applied by the autonomic system to the executing application after the profile is collected for improving the subsequent behavior of the application.

Figure 2A:
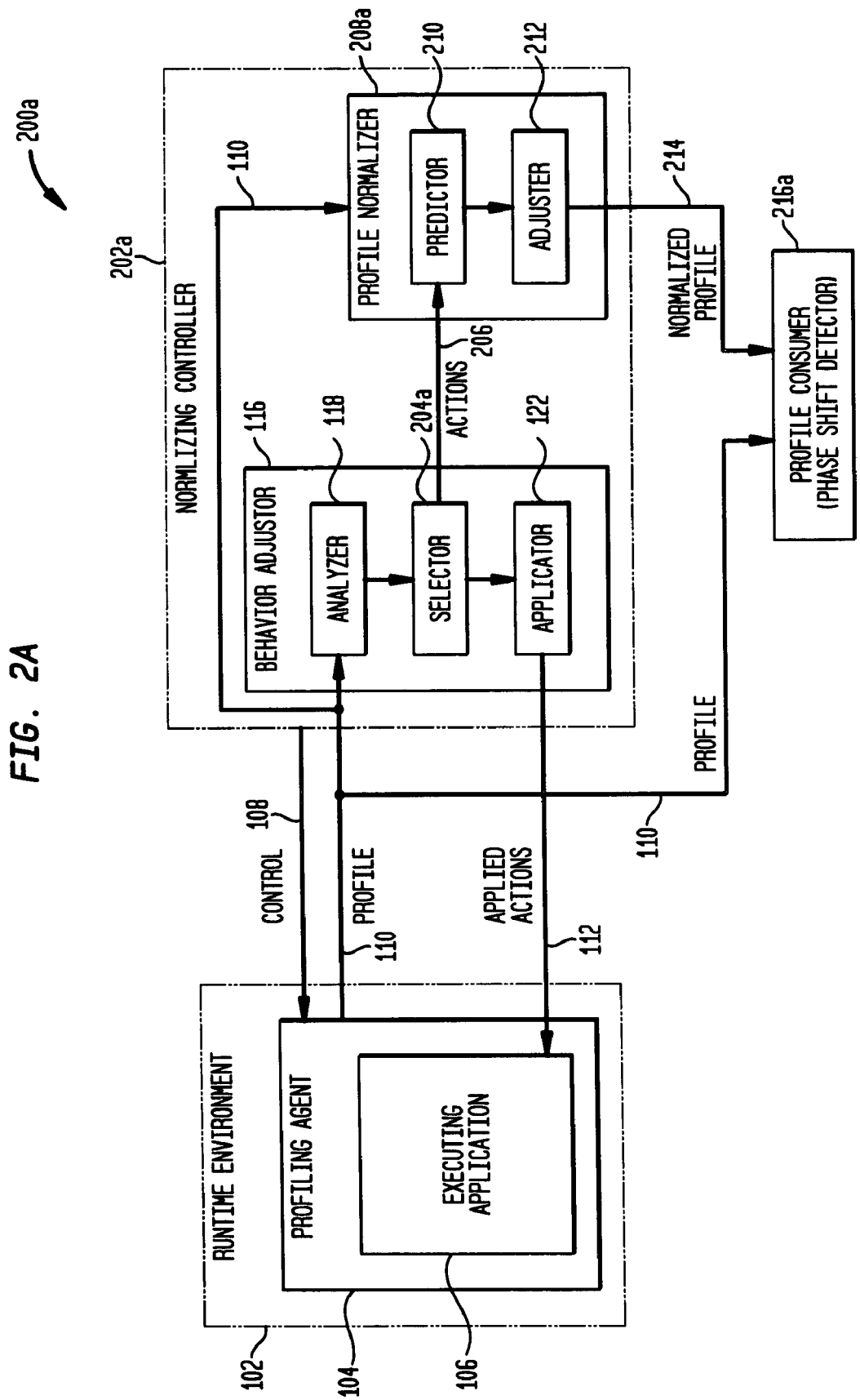
FIG. 2A illustrates an exemplary first embodiment of an autonomic software system that is enabled to normalize a profile collected from an executing application to account for the one or more actions taken by the autonomic software system after the profile is collected, according to the present invention.

FIG. 2A is an exemplary illustration of a first embodiment of an autonomic software system 200a that is enabled to normalize a profile collected from an executing application to account for the one or more actions taken by the autonomic software system 200a after the profile is collected, according to the present invention. The autonomic software system 200a of the first embodiment comprises the following three main components: a profiling agent 104; a normalizing controller 202a; and a profile consumer (i.e., phase shift detector) 216a. The profiling agent 104 executes the application 106 in the runtime environment 102 and based on a control signal 108 from a normalizing controller, 202, the profiling agent 104 collects a plurality of profiles 110. More specifically, the profiling agent 104 collects each profile 110 of the executing application's 106 behavior during a predetermined time interval, as controlled via the control signal 108, and transmits the collected profile 110 to the inventive normalizing controller 202a as well as to the profile consumer 216a. A preferred predetermined time interval for collecting a profile 110 is ten milliseconds. For example, a user timer interrupt may easily used to accomplish the collection of a profile during this predetermined time interval, or any other predetermined time interval as may need by particular user requirements. The profiling agent 104 may be implemented as instrumented code that is added to a source code of an application, which is compiled into the executing application 106, or by monitoring the execution of the executing application 106 in the run-time environment 102.

Figure 1:
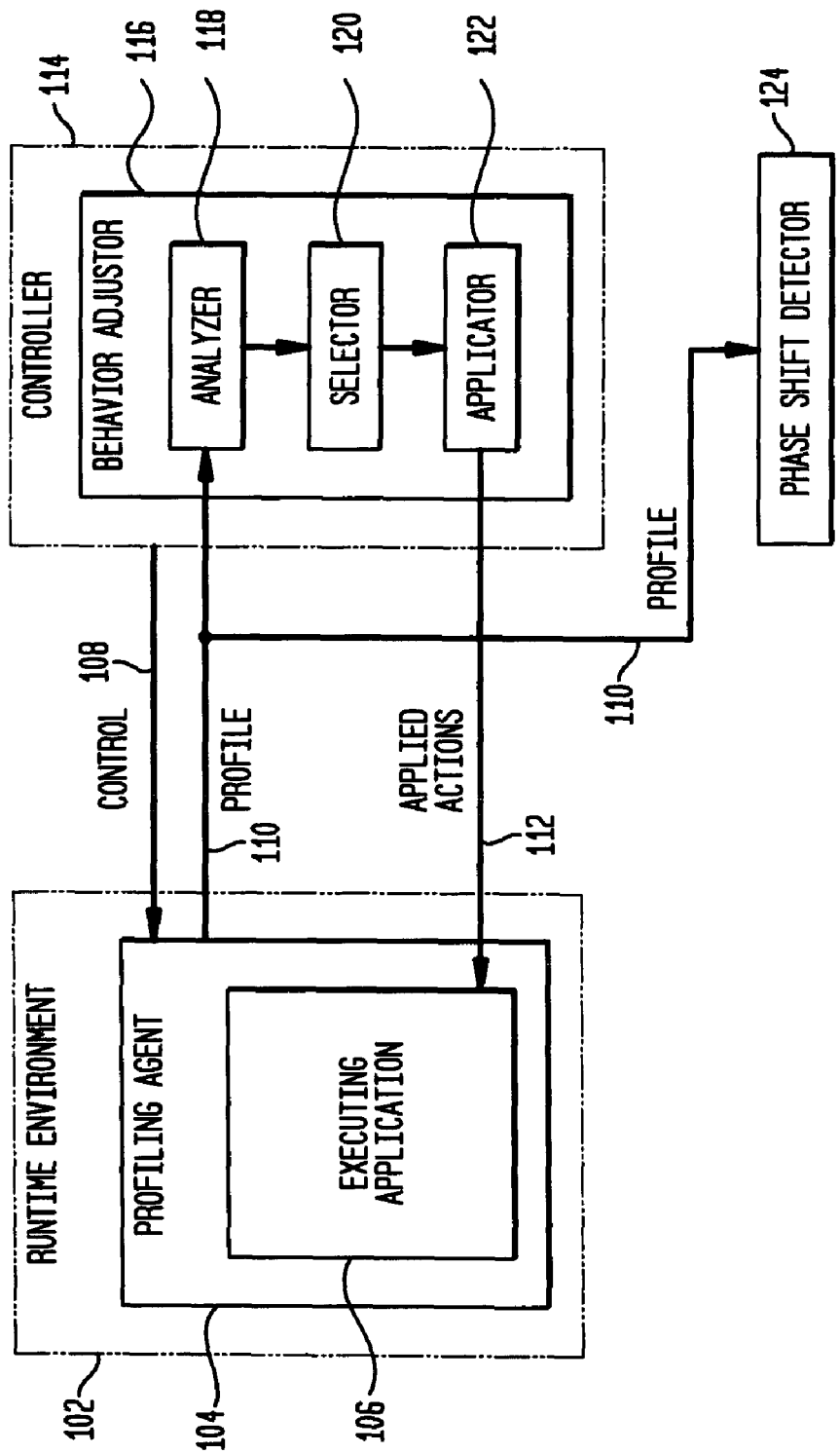
FIG. 1 illustrates a prior art autonomic system and depicts the shortcomings of the prior art autonomic system.

Further with reference to FIG. 2A, the normalizing controller 202a comprises a behavior adjustor 116 that adjusts the behavior of the executing application 106 based on a collected profile 110. The behavior adjustor 116 comprises an analyzer 118, a selector 204a and an applicator 122. It is noted that the analyzer 118 and the applicator 122 are similar to like components in the prior art FIG. 1. The analyzer 118 receives a profile 110 collected by the profiling agent 104 during a predetermined time interval and produces a set of data that is utilizable in the controller 202a as described above. The analyzer 118 then transmits the set of data to the selector 204a, which selects one or more actions 206 from the set of data to improve the behavior of the executing application 106. Lastly, the selector 204a transmits the one or more actions 206 selected from the set of data to the applicator 122, which applies the selected one or more actions 112 to the executing application 106.

Still further with reference to FIG. 2A, the normalizing controller 202a comprises a profile normalizer 208a that normalizes the collected profile 110 for use by a profile consumer (phase shift detector) as will be discussed below. The profile normalizer 208a comprises a predictor 210 that utilizes the cost-benefit model described above for predicting an expected decrease in execution time of a particular method and an adjustor 212 for adjusting or normalizing the collected profile 110 to produce a normalized profile 214 according to the prediction. It is noted that the profile 110 (and a subsequent-profile) collected by the profiling agent 104 from the executing application 106 is also transmitted to the profile normalizer 208a of the normalizing controller 202a. As depicted in FIG. 2A, the selector 204a of the behavior adjustor 116 is distinguished from the corresponding prior art selector 120 in that it not only transmits the selected one or more actions 206 to the applicator 122 but it also transmits the selected one or more actions 206 to the predictor 210 of the profile normalizer 208a. Exemplary normalizations of a collected profile 110 via the profile normalizer will be described in detail hereinafter with reference to exemplary FIGS. 3A and 3B. The predictor 210 of the profile normalizer 208a receives the collected profile 110 and one or more actions 206 selected by the selector 204a. The predictor 210 then utilizes the one or more actions 206 selected by the selector 204a to predict the behavior of the executing application 106 when the one or more actions 206 are applied to the executing application 106 by the applicator 122, before a subsequent profile 110 is obtained from the executing application. As described above, the prediction involves a prediction of an expected decrease in execution time. The predictor 210 transmits the prediction result to the adjustor 212 that applies the prediction result to the profile 110 to thereby generate a normalized profile 214 that is transmitted to a profile consumer (phase shift detector) 216a, which utilizes the normalized profile 214 and a subsequent collected profile to detect phase shifts in the executing application 106. As noted, in the autonomic system 200a, the profile consumer 216a is a phase shift detector that detects phase shifts in the executing application 106. However, the profile consumer may be any other system component that can benefit from the normalized profile 216a. For example, the profile consumer may be an online visualization tool that graphically depicts how a normalized profile changes with respect to a subsequently collected profile and/or a current profile. FIG. 2A clearly depicts the advantage of the present invention in that the profile consumer 216a has the benefit of a normalized profile 214 collected from the executing application 106 that accounts for the one or more actions applied 112 by the behavior adjustor to the executing application 106 before a subsequent profile 110 is collected from the executing application 106. The phase shift detector 216a receives a subsequent profile 110 and the normalized profile 214 and can more readily determine a phase shift in the executing application 106. The determination may be accomplished by comparing how similar the subsequent profile 110 is to the normalized profile 214.

Figure 2B:
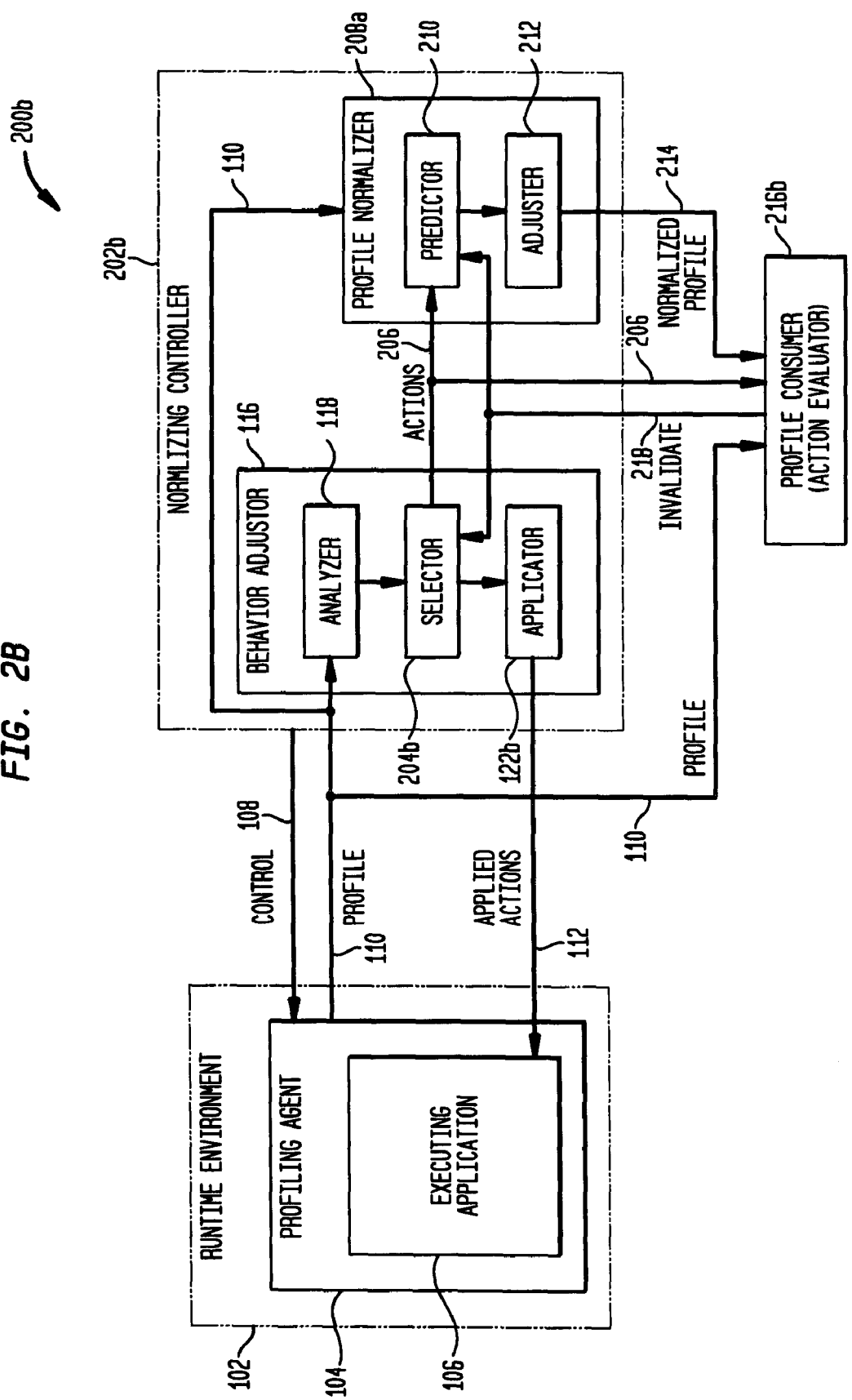
FIG. 2B illustrates an exemplary second embodiment of an autonomic software system that is enabled to normalize a profile collected from an executing application to account for the one or more actions taken by the autonomic software system after the profile is collected, according to the present invention.

FIG. 2B is an exemplary illustration of a second embodiment of an autonomic software system 200b that is enabled to normalize a profile collected from an executing application to account for the one or more actions taken by the autonomic software system 200b after the profile is collected, according to the present invention. In the second embodiment 200b it is assumed that the application 106 is executing in a steady state, i.e., no phase shift is occurring. Also in the second embodiment 200b, the profile consumer is an action evaluator 216b for evaluating the one or more actions 206 selected by selector 204b, thereby fine-tuning the selector's 204b ability to determine the impact of the selected actions on the behavior of the executing application 106. The action evaluator 216b will be described in greater detail below. The behavior adjustor 116 comprises an analyzer 118, a selector 204b and an applicator 122b. It is noted that the analyzer 118 has the same functionality to that in the first embodiment 200a depicted in FIG. 2A. The analyzer 118 receives a profile 110 collected by the profiling agent 104 during a predetermined time interval and produces a set of data as described above. The analyzer 118 then transmits the determined set of data to the selector 204b, which selects one or more actions 206 from the set of data that will improve the behavior of the executing application 106. The selector 204b then transmits the one or more actions 206 to the applicator 122b that applies 112 the selected one or more actions 206 to the executing application 106. In addition, the selector 204b also transmits the selected one or more actions 206 to the profile normalizer 208a and the profile consumer (action evaluator) 216b. The predictor 210 of the profile normalizer utilizes the one or more actions 206 and profile 110 to predict the behavior of the executing application 106 when the one or more actions 206 are applied to the executing application 106 by the applicator 122b. The predictor 210 then transmits the prediction result to the adjuster 212 that applies the prediction result to the profile 110 to thereby generate a normalized profile 214 that is transmitted to the profile consumer (action evaluator) 216b, which utilizes the normalized profile 214.

Further with reference to FIG. 2B, the operation of the profile consumer (action evaluator) 216b will be described in greater detail. As described above, the profile consumer 216b receives the one or more actions 206 transmitted by the selector 204b and the normalized profile 214 transmitted by the profile normalizer 208a. In addition, the profile consumer 216b receives the current profile 110 and all subsequent profiles 110 collected by the profiling agent 104 based on control 108 from the normalizing controller 202b. In the second embodiment 200b, it is assumed that the normalizing controller 202b via the behavior adjustor 116 has supplied one or more selected actions 206 and via the profile normalizer 208a has supplied the normalized profile 214 to the profile consumer 216b, both for a current profile 110. It is further assumed that the one or more actions 206 for the current profile have been applied 112 by the applicator 122b to the executing application 106. At this point, the normalizing controller 202b via the control signal 108 directs the profiling agent 104 to collect a subsequent profile 110 from the executing application 106. The processing for the subsequently collected profile 110 will now be described. The profiling agent 104 transmits the subsequent profile 110 to the normalizing controller 202b for processing as described above, and in addition transmits the subsequent profile 110 to the profile consumer (action evaluator) 216b. The action evaluator 216b evaluates the normalized profile 214 for the previously collected profile 110 against the subsequently collected profile 110 that reflects one or more actions 206 applied to the executing application 106 based on the previously collected profile 110. If the action evaluator 216b determines that the one or more actions 206 applied based on the previously collected profile did not have the desired improvement effect on the executing application 106, the action evaluator 216b invalidates the previously applied one or more actions. The action evaluator 216b invalidates the one or more applied actions by transmitting an invalidate control signal 218 to the selector 204b to undo the previously applied actions 206. If an invalidate control signal is transmitted, the selector 204b also updates its cost-benefit model so that the selector 204b does not choose the invalidated one or more actions again in processing future profiles 110 under the same circumstances as just described. A description will be provided below regarding the invalidation in the second embodiment 200b.

Still further with reference to FIG. 2B, below there is provided a description of an exemplary evaluation and invalidation performed by the profile consumer (action evaluator) 216b. For example, it is assumed that the action evaluator 216b has received a collected profile P1, actions, A1, applied to the executing application as a result of P1, and the normalized profile, NP1, where P1 is normalized with respect to A1. After the actions A1 are applied to the executing application, a subsequent profile, P2, is collected and transmitted to the profile evaluator 216b. It is further assumed that the executing application is in a steady state, i.e., a phase shift does not occur at this time. If P2 and NP1 are not similar then the selector's 204b (and the predictor's 210) understanding of how-the actions, A1, would modify the executing application's behavior on the basis of P1 was incorrect. The action evaluator determines one or more of the actions, A1, that correspond to the regions of P2 and NP1 that are dissimilar and invalidates these regions by transmitting an invalidate control signal 218 to the selector 204b and the predictor 210. The invalidate control signal 218 transmitted is preferably a tuple comprising <P1, NP1, A2, P2>, where actions, A2, may be all of A1 or a subset of A1. The selector 204b and predictor 210 update their cost-benefit models. On the basis of the invalidate control signal, the selector 204b selects actions, A3, and transmits the actions to the applicator 122b for application to the executing application 106, thereby undoing actions, A2, that are to be invalidated. The selection of actions by the selector 204b to invalidate previously applied actions reflects whether that represents a net advantage to the executing application 106. For example, if an action was to optimize (i.e., compile) a method from optimization level 0 to optimization level 2, the action can be invalidated by recompiling the method at optimization level 0. On the other hand, if the cost of recompiling the method (recompilation time) is greater than the benefit of improved behavior (reduction in execution time), then the selector 204b will not have the applicator 122b undo the action.

Figure 2C:
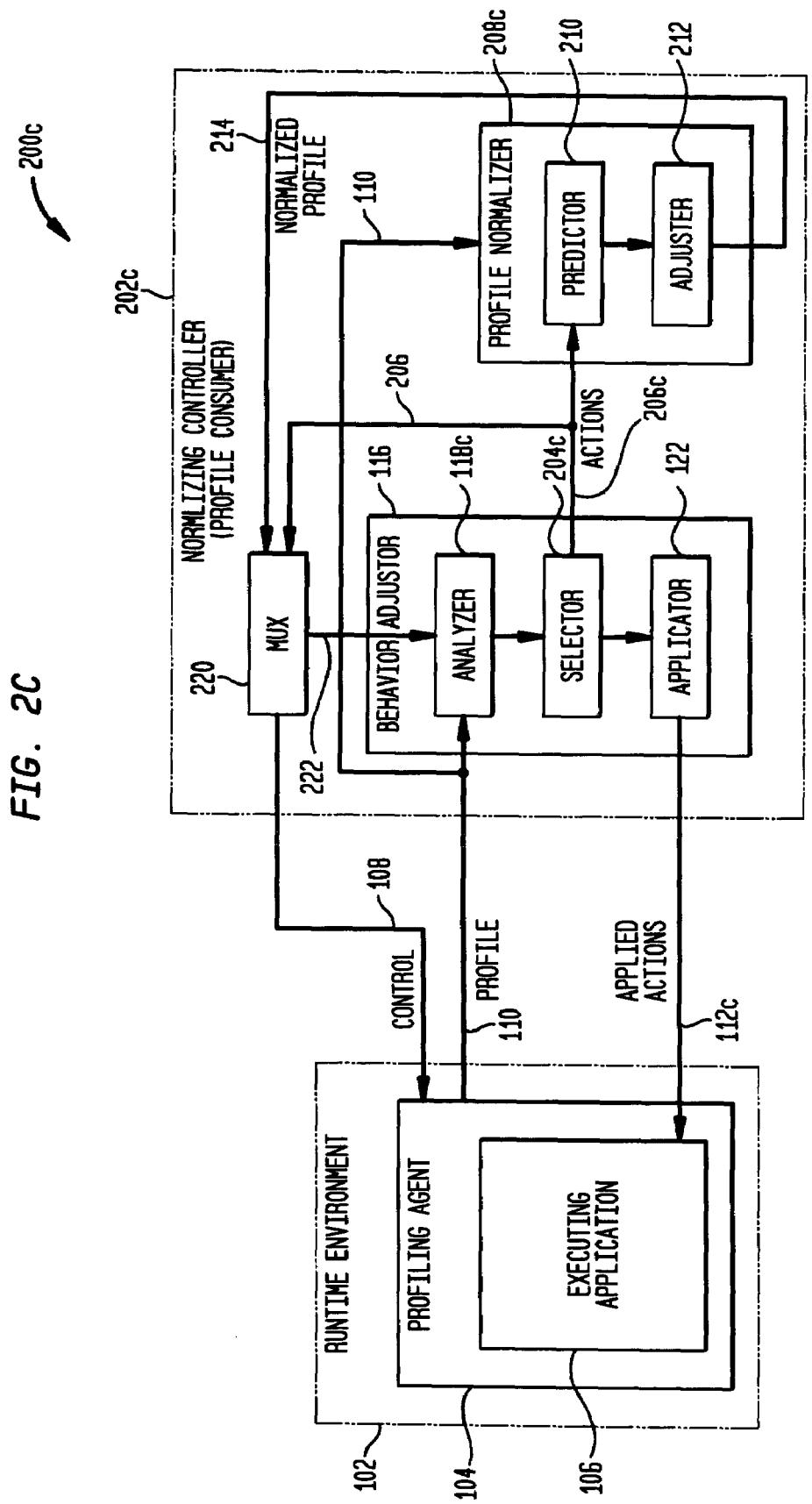
FIG. 2C illustrates an exemplary third embodiment of an autonomic software system that is enabled to normalize a profile collected from an executing application to account for the one or more actions taken by the autonomic software system after the profile is collected, according to the present invention.

FIG. 2C is an exemplary illustration of a third embodiment of an autonomic software system 200c that is enabled to normalize a profile collected from an executing application to account for one or more actions taken by the autonomic software system 200c after the profile is collected, according to the present invention. In third embodiment 200c, the profile consumer is the normalizing controller itself 202c. The normalizing controller 202c utilizes the normalized profile 214 so that the selector 204c can make better decisions as to what actions to select. More specifically, if the benefits of two actions are dependent then selecting the best action of the two and normalizing the profile before picking the next action from the normalized profile would better improve the behavior of the application. Two actions are dependent if the improved behavior of the application is less when both actions are applied than the combined improvement when each action is applied to the application separately. For example, if a profile indicates that two methods execute often, then the selector 204c might choose to optimize both methods; however, if one method is only executed when called from the other method and the other method inlines the one method, then the inlined method should not be optimized.

Further with reference to FIG. 2C, the normalizing controller (profile consumer) 202c comprises a multiplexer (i.e., "MUX") 220 that issues a control signal to the profiling agent 104 to collect a profile 110 from the executing application 106. The MUX 220 also provides a normalized profile to an analyzer 118c of the behavior adjustor 116 as will be described in greater detail below. The behavior adjustor 116 comprises the analyzer 118c, a selector 204c and an applicator 122. It is noted that the applicator 122 has the same functionality to that in the first embodiment 200a depicted in FIG. 2A. The analyzer 118c receives a profile 110 collected by the profiling agent 104 during a predetermined time interval, analyzes the data as described above and produces a set of data utilizable by the normalizing controller 202c. The analyzer 118 then transmits the set of data to the selector 204c. Preferably, the selector 204c selects an action 206c from the set of data that will change and improve the behavior of the executing application 106. The selector 204c transmits the selected action 206c to the applicator 122 that applies 112c the selected action 206c to the executing application 106. In addition, the selector 204c also transmits the selected action 206c to the predictor 210 of the profile normalizer 208c and the MUX 220 as will be described below. Alternately to the foregoing, the selector 204c may select no actions from the set of data produced by the analyzer 118c. If the selector 204c selects no actions, the selector 204c notifies the MUX 220 and the MUX 220 issues a control signal to the profiling agent 104 to collect a new profile 110 from the executing application 106. In addition, when the selector 204c selects no actions, the selector 204c transmits nothing to the applicator 122 or to the predictor 210 of the profile normalizer 208c and the forgoing processing is performed for the new profile.

Still further with reference to FIG. 2C, if however, a selected action is transmitted from the selector 204c to the predictor 210 of the profile normalizer 208c, the predictor 210 utilizes the selected action 206c and profile 110 to predict the behavior of the executing application 106 when the action 206c is applied to the executing application 106 by the applicator 122. The predictor 210 then transmits the prediction result to the adjustor 212 that applies the prediction result to the profile 110 to thereby generate a normalized profile 214 that is transmitted from the profile normalizer 208c to the MUX 220. When, the MUX 220 receives the selected action from the selector 204c and the normalized profile 214, instead of instructing the profiling agent 104 to collect a new profile 110 from the executing application 106, the MUX 220 transmits the normalized profile 214 to the analyzer 118c and instructs the analyzer 118c to analyze the normalized profile 214. The analyzer 118c analyzes the normalized profile 214 and produces a set of data as described above. The analyzer 118c then transmits the set of data to the selector 204c that either selects an action 206c from the set of data from the normalized profile 214 or selects no actions. If the selector 204c selects an action, the selected action 206c is transmitted to the applicator 122 that applies 112c the selected action 206c to the executing application 106. In addition, the selector 204c also transmits the selected action 206c to the predictor 210 of the profile normalizer 208c and the MUX 220. Alternately to the foregoing, if the selector 204c selects no actions from the set of data produced by the analyzer 118c, the selector 204c notifies the MUX 220 and the MUX 220 issues a control signal to the profiling agent 104 to collect a new profile 110 from the executing application 106. In addition, when the selector 204c selects no actions, the selector 204c transmits nothing to the applicator 122 or to the predictor 210 of the profile normalizer 208c and processing described above is performed for the newly collected profile 110. The foregoing enables the normalizing controller 202c to account for successive actions applied to the executing application 106 before another profile is collected from the executing application 106. Stated another way, the normalizing controller 202c utilizes successively normalized profiles 214 to enable the selector 204c to make better decisions as to what actions to select.

Figure 3A:
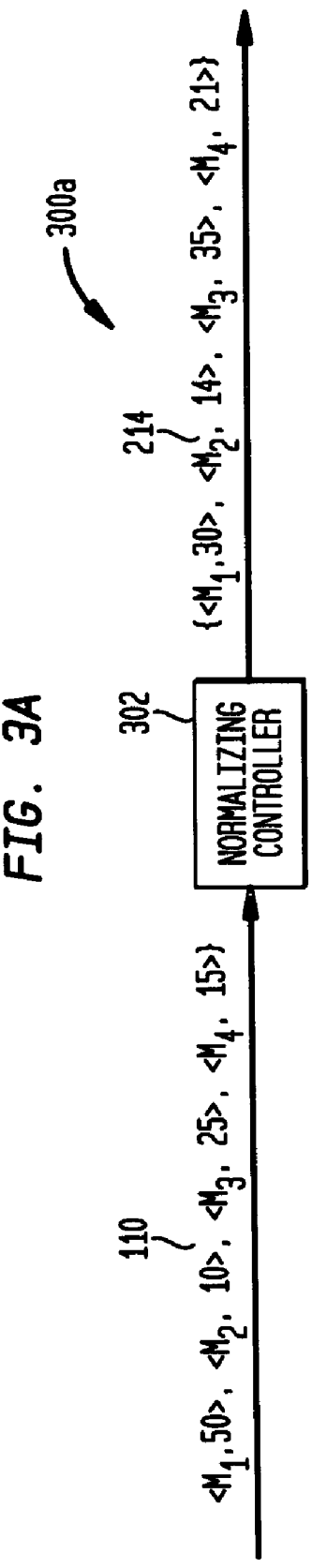
FIG. 3A illustrates an exemplary normalization performed by a normalizing controller in the foregoing three embodiments of the autonomic software system, according to the present invention.

FIG. 3A is an exemplary illustration of the normalization 300a that may be performed by the normalizing controller in the foregoing three embodiments of the autonomic software system, according to the present invention. For the sake of clarity and brevity, a normalizing controller 302 represents any of the normalizing controllers 200a, 200b and 200c in the foregoing three embodiments, which are enabled to normalize a collected profile 10 and generate a normalized profile 214. In the illustration 300a, the collected profile 110 comprises a plurality of method and weight pairs. Let $P_1$ be the profile 110 that is collected from the executing application 106 before one or more actions, A, are applied by the autonomic software system to the executing application 106. Furthermore, it is assumed that $P_1$ has profiled methods $M_1$, $M_2$, $M_3$, and $M_4$ and that the weights profiled by the profiling agent 104 for these methods are 50, 10, 25 and 15, respectively, which total to the weight 100 for the profile 110. Thus, applying the profiled weights to the profiled methods, profile $P_1 = \{<M_1,50>,<M_2,10>,<M_3,25> \text{and} <M_4,15>\}$. Additionally, it is assumed that the one or more actions in A only affect the method $M_1$ and reduce its execution time (i.e., improving its performance) by 40%. Thus, applying the 40% percent reduction to the weight associated with method $M_1$ profile $P_1^1 = \{<M_1,30>\}$ (i.e., weight 50−[weight 50*40% =20]=30). The weights for the other methods $M_2$, $M_3$, and $M_4$ are adjusted according to the reduction for method $M_1$, which in effect increases their execution time proportionately to the reduction of execution time for method $M_1$. More specifically, profile $P_1^1 = \{<M_1,30>,<M_2,14>,<M_3,35> \text{and} <M_4,21>\}$. For example, the new weight for the method $M_2$ is computed as follows. $M_2$'s initial weight is 10. The cumulative weight of all the unaffected methods $M_2$, $M_3$ and $M_4$ is equal to 50 (i.e., total weight 100−50 affected weight of method $M_1$=50 unaffected weight for $M_2$, $M_3$ and $M_4$). Therefore, 10/50 is 20%, and 20% of 20 (the reduction in $M_1$'s weight) is an additional weight 4, which is added to $M_2$'s initial weight to derive $M_2$'s new weight of 14. The same processing is performed for the other weights associated with methods $M_3$ and $M_4$. Therefore, given a profile, $P_1$, that was collected over a predetermined time interval, $T_1$, and a set of one or more actions, A, that were applied by the autonomic software system after the profile was collected, $P_1$ is normalized with respect to A by adjusting $P_1$ to reflect the application of A.

Figure 3B:
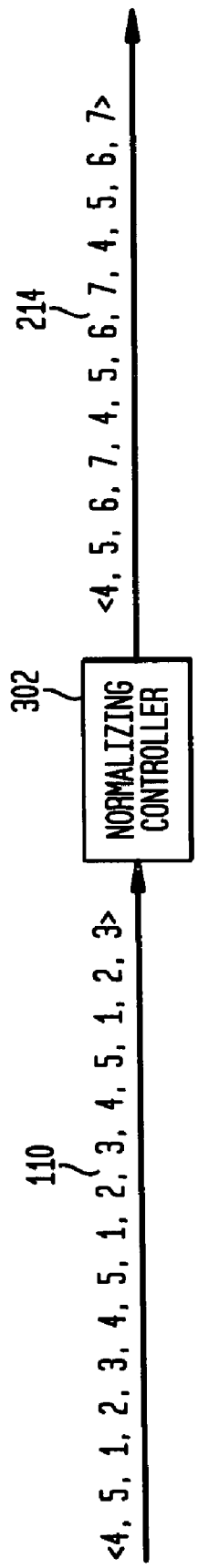
FIG. 3B illustrates another exemplary normalization performed by a normalizing controller in the foregoing three embodiments of the autonomic software system, according to the present invention.

FIG. 3B is another exemplary illustration of the normalization 300b that may be performed by the normalizing controller in the foregoing three embodiments of the autonomic software system, according to the present invention. For the sake of clarity and brevity, the normalizing controller 302 represents any of the normalizing controllers 200a, 200b and 200c in the foregoing three embodiments, which are enabled to normalize a collected profile 110 and generate a normalized profile 214. In the illustration 300b, the collected profile 110 comprises a plurality of basic blocks represented by integers. During the predetermined time period when the profile is collected, when a basic block in the application is executed, the basic block's corresponding integer is written to the profile collected 110. Let $P_1$ be the profile 110 that is collected from the executing application 106 before one or more actions, A, are applied by the autonomic software system to the executing application 106. Furthermore, it is assumed for this illustration that $P_1$ has profiled the execution of basic blocks 1, 2, 3, 4, 5 as shown in FIG. 3B. Additionally, it is assumed for this illustration that basic blocks 1, 2, and 3 make up a method, M, and an action, A, states that the method M should be optimized. The optimized method, M, consists of basic blocks 6 and 7. Thus, the normalizing controller replaces the basic blocks 1, 2, and 3 in profile $P_1$ with basic blocks 6 and 7 in the normalized profile 214, as shown in FIG. 3B.

Figure 4A:
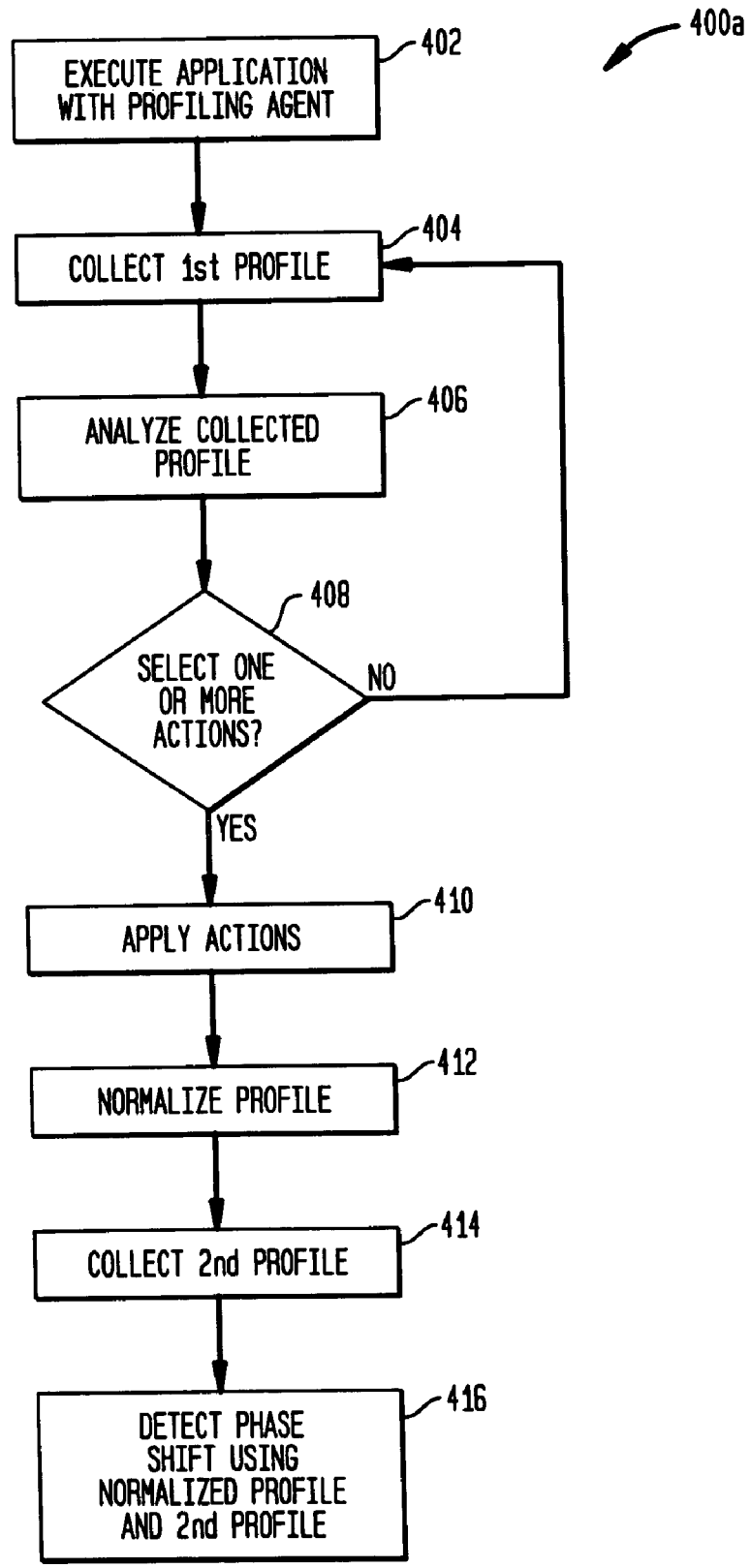
FIG. 4A illustrates an exemplary method flowchart for the first embodiment of the autonomic software system.

FIG. 4A is an exemplary method flowchart 400a for the first embodiment of the autonomic software system 200a that is enabled to normalize a profile collected from an executing application to account for the one or more actions taken by the autonomic software system 200a after the profile is collected, according to the present invention. The method begins with step 402, where the profiling agent 104 executes an application 106 in the runtime environment 102. At step 404, the normalizing controller 202a controls the profiling agent via control signal 108 to collect a first profile 110. At step 406, the normalizing controller 202a analyzes the collected first profile 110 via the analyzer 118, determining a set of data that is utilizable in the normalizing controller 202a. Thereafter, at step 408, the normalizing controller 202a determines from the data whether to select one or more actions to apply to the executing application 106 or not to select any actions. If no actions are selected at step 408, the method continues at step 404, where another profile is collected from the executing application 106. Alternatively, if one or more actions are selected at step 408, at step 410, the applicator 122 applies the selected one or more actions to the executing application 106. At step 412, the profile normalizer 208a of the normalizing controller 202a normalizes the collected first profile 110. At step 414, the normalizing controller 202a instructs the profiling agent 104 to collect a second profile 110. Thereafter, at step 416, the phase shift detector detects a phase shift in the executing application using the normalized profile 214 obtained from the normalization of the first profile collected at step 404 and the second profile collected at step 414. As described above, a phase shift may be detected by comparing for similarity the normalized profile 214 to the second collected profile.

Figure 4B:
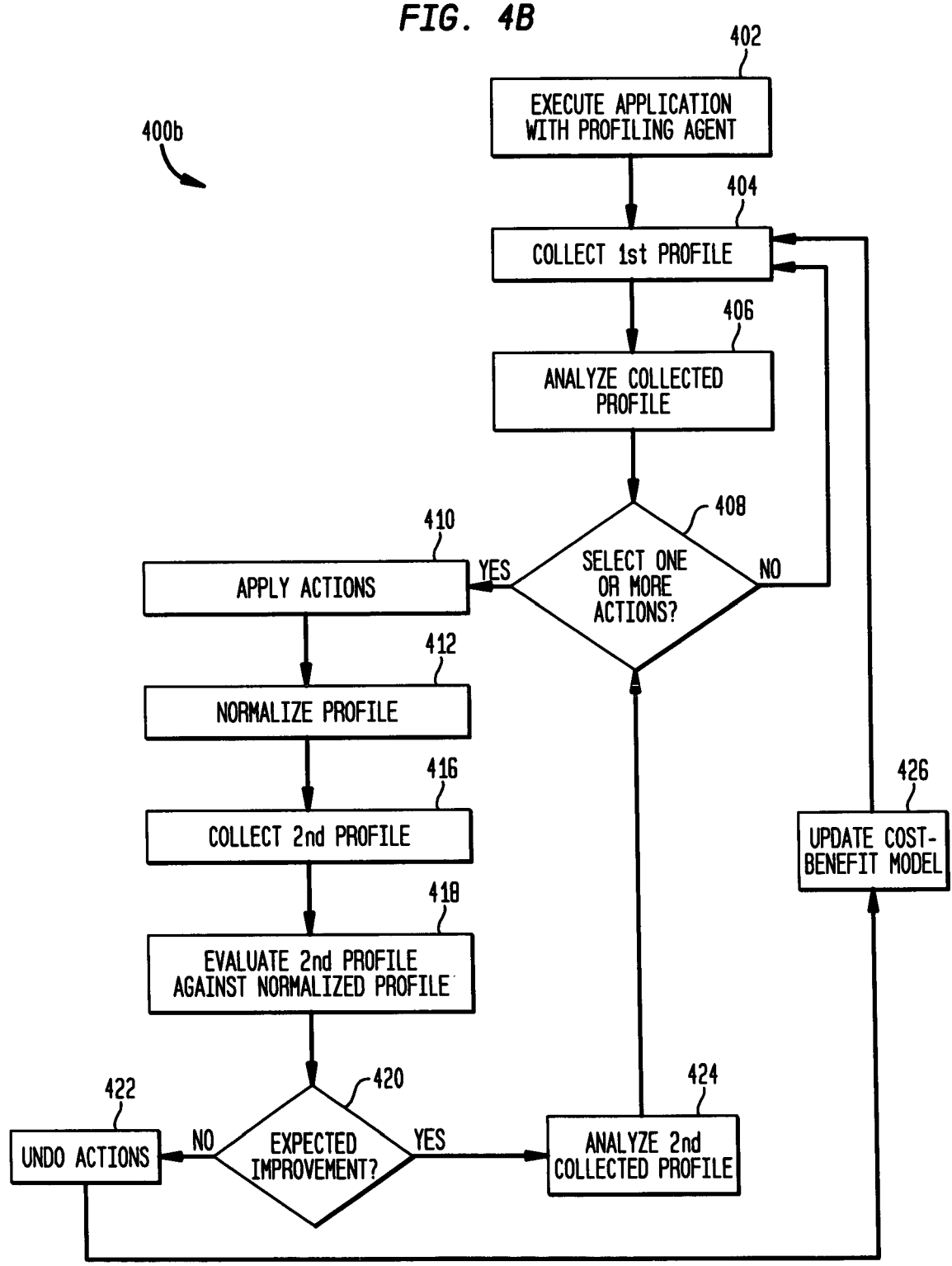
FIG. 4B illustrates an exemplary method flowchart for the second embodiment of the autonomic software system.

FIG. 4B is an exemplary method flowchart 400b for the second embodiment of the autonomic software system 200b that is enabled to normalize a profile collected from an executing application to account for the one or more actions taken by the autonomic software system 200b after the profile is collected, according to the present invention. The method begins with step 402, where the profiling agent 104 executes an application 106 in the runtime environment 102. At step 404, the normalizing controller 202b controls the profiling agent via control signal 108 to collect a first profile 110. At step 406, the normalizing controller 202b analyzes the collected first profile 110 via the analyzer 118, producing a set of data to be utilized in normalizing controller 202b. Thereafter, at step 408, the normalizing controller 202b via the selector 204b determines from the set of data whether to select one or more actions to apply to the executing application 106 or not to select any actions. If no actions are selected at step 408, the method continues at step 404, where another profile is collected from the executing application 106. Alternatively, if one or more actions are selected at step 408, at step 410, the applicator 122b applies the selected one or more actions to the executing application 106. At step 412, the profile normalizer 208a of the normalizing controller 202b normalizes the collected first profile 110 to generate a normalized profile 214. Thereafter, at step 416, the normalizing controller 202b instructs the profiling agent 104 to collect a second profile 110. At step 418, the profile consumer (action evaluator) 216b evaluates the second collected profile against the normalized profile obtained from the first collected profile normalized at step 412. At step 420 it is determined from the second collected profile and the normalized profile whether there is an expected improvement. If there is an expected improvement at step 420, the method continues at step 424, where the normalizing controller 202b via the analyzer 118 analyzes the second collected profile to produce a set of data to be utilized in normalizing controller 202b. The method continues at step 408, where the selector 204b selects one or more actions from the set of data from the second collected profile. Thereafter, the method continues from step 408 as described above. Alternatively, if it is determined at step 420 that there is no expected improvement from the second profile 110 and the normalized profile 214, at step 422, the normalizing controller 202b via invalidate control signal 218 instructs the selector 204b to invalidate actions applied to the executing application 106 at step 410, thereby undoing the applied actions as described above. At step 426, the cost-benefit model utilized by the selector 204b and the predictor 210 is updated. Thereafter, the method continues at step 404 by collecting another profile 110.

Figure 4C:
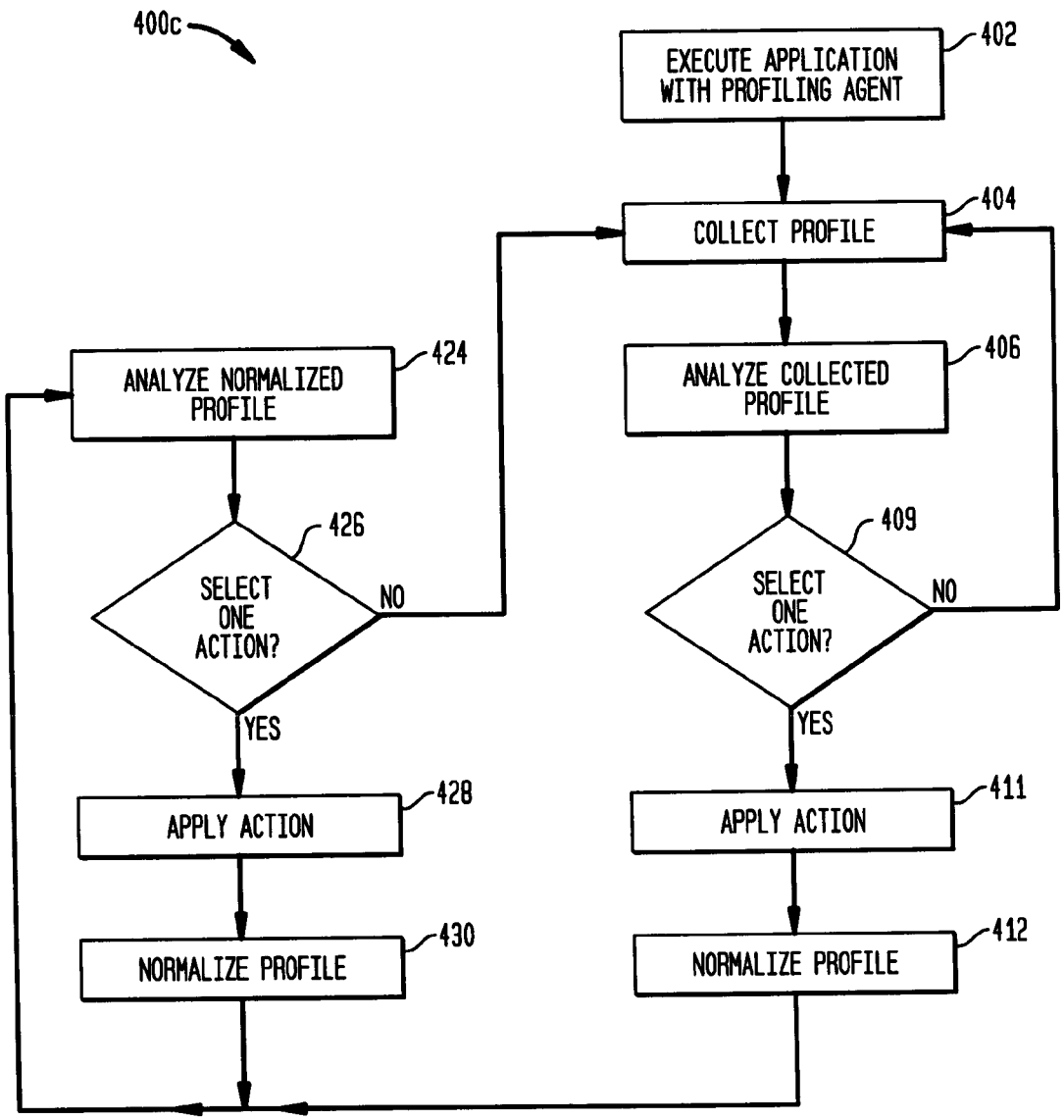
FIG. 4C illustrates an exemplary method flowchart for the third embodiment of the autonomic software system.

FIG. 4C is an exemplary method flowchart 400c for the third embodiment of the autonomic software system 200c that is enabled to normalize a profile collected from an executing application to account for the one or more actions taken by the autonomic software system 200c after the profile is collected, according to the present invention. The method begins with step 402, where the profiling agent 104 executes an application 106 in the runtime environment 102. At step 404, the normalizing controller 202c controls the profiling agent via control signal 108 to collect a profile 110. At step 406, the normalizing controller 202c analyzes the collected profile 110 via the analyzer 118, producing a set of data utilizable by the normalizing controller 202c. Thereafter, at step 409, the normalizing controller 202c determines via selector 204c from the set of data whether to select one action to apply to the executing application 106 or not to select an action. If no action is selected at step 409, the method continues at step 404, where another profile is collected from the executing application 106. Alternatively, if an action is selected at step 409, at step 411, the applicator 122 applies the selected action to the executing application 106. At step 412, the profile normalizer 208c of the normalizing controller 202c normalizes the collected profile 110 to generate a normalized profile 214. Thereafter, at step 424, the normalizing controller 202c via the MUX 202 instructs the analyzer 118c to analyze the normalized profile 124, producing a set of data from the normalized profile in a manner described above. At step 426, the normalizing controller 202c determines via selector 204c from the set of data whether to select one action to apply to the executing application 106 or not to select an action. If no action is selected at step 426, the method continues at step 404, where another profile is collected from the executing application 106. Alternatively, if an action is selected at step 426, at step 428, the applicator 122 applies the selected action to the executing application 106. Thereafter, at step 430, the profile normalizer 208c of the normalizing controller 202c normalizes the normalized profile 214 to generate yet another a normalized profile 214. The method continues at step 424 and executes steps 424-430 until no further action is selected at step 426. Then, the method continues at step 404, collecting another profile 110 from the executing application 106.

While the invention has been particularly shown and described with regard to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for adjusting a profile collected for an executing application to account for one or more actions applied to the executing application to improve detection of phase shifts in the executing application after the profile was collected, the method comprising:
  (a) collecting a first profile for the executing application;
  (b) predicting, based on the profile and the one or more actions, an impact on the executing application of applying the one or more actions to the executing application;
  (c) adjusting the first profile to form a normalized profile according to the predicted impact;
  (d) applying the one or more actions to the executing application;
  (e) collecting a second profile for the executing application after applying the one or more actions; and
  (f) detecting a phase shift in the executing application by utilizing the normalized profile and the second profile.

2. The method of claim 1, wherein the step of predicting is performed using a cost-benefit model.

3. The method of claim 1, further including: selecting the one or more actions for applying to the executing application.

4. The method of claim 3, wherein the step of selecting is performed using a cost-benefit model.

5. A system for adjusting a profile collected for an executing application to account for one or more actions applied to the executing application to improve detection of phase shifts in the executing application after the profile was collected, the system comprising:
  a processor;
  a profiling agent for collecting a first profile and a second profile for the executing application;
  a predictor for predicting, based on the first profile and the one or more actions, an impact on the executing application of applying the one or more actions to the executing application;
  an adjuster for adjusting the first profile to form a normalized profile according to the predicted impact;
  an applicator for applying the one or more actions to the executing application; and
  a phase shift detector for detecting a phase shift in the executing application by utilizing the normalized profile and the second profile, the second profile collected after the step of applying the one or more actions to the executing application.

* * * * *